United States Patent
Matsushita et al.

(10) Patent No.: US 8,297,144 B2
(45) Date of Patent: Oct. 30, 2012

(54) OPERATING DEVICE FOR MANUAL TRANSMISSION APPARATUS

(75) Inventors: Ryuichi Matsushita, Aichi-ken (JP); Kazuo Yoshida, Ena (JP); Tetsuzou Yoneda, Toyota (JP)

(73) Assignee: Aisin AI Co., Ltd, Nishio-Shi, Aichi-Ken (JP)

( * ) Notice: Subject to any disclaimer, the term of this patent is extended or adjusted under 35 U.S.C. 154(b) by 308 days.

(21) Appl. No.: 12/481,184

(22) Filed: Jun. 9, 2009

(65) Prior Publication Data
US 2009/0301251 A1 Dec. 10, 2009

(30) Foreign Application Priority Data
Jun. 9, 2008 (JP) .................. 2008-150609

(51) Int. Cl.
*F16H 59/04* (2006.01)
(52) U.S. Cl. .................. 74/473.36; 74/473.37
(58) Field of Classification Search .............. 74/335, 74/337.5, 339, 473.1, 473.3, 473.36, 473.37
See application file for complete search history.

(56) References Cited

U.S. PATENT DOCUMENTS

| | | | | |
|---|---|---|---|---|
| 4,531,418 A | * | 7/1985 | Takahasi et al. ............. | 74/339 |
| 4,531,623 A | * | 7/1985 | Arai et al. ................ | 192/82 R |
| 4,572,020 A | * | 2/1986 | Katayama ............... | 74/473.21 |
| 2006/0169083 A1 | * | 8/2006 | Matsuda ................ | 74/473.1 |
| 2007/0089556 A1 | * | 4/2007 | Kim ..................... | 74/473.3 |
| 2007/0142153 A1 | * | 6/2007 | Kasuya ................... | 475/34 |
| 2008/0087120 A1 | | 4/2008 | Nakane et al. | |

FOREIGN PATENT DOCUMENTS

| | | |
|---|---|---|
| DE | 102 10 972 A1 | 10/2003 |
| EP | 0 488 857 A1 | 6/1992 |
| EP | 1 717 490 A2 | 11/2006 |
| JP | 2003-106449 A | 4/2003 |
| JP | 2008-32158 A | 2/2008 |

OTHER PUBLICATIONS

Extended European Search Report dated Aug. 10, 2009 in corresponding European Application No. 09007541.7.
Copending Application, entitled "Operating Device for Manual Transmission Apparatus" naming Ryuichi Matsushita, Kazuo Yoshida, Ryuji Honma and Yoshinori Nishi as inventors, filed on Jun. 9, 2009.

\* cited by examiner

*Primary Examiner* — Justin Krause
*Assistant Examiner* — Adam D Rogers
(74) *Attorney, Agent, or Firm* — Buchanan Ingersoll & Rooney PC

(57) ABSTRACT

An operating device for a manual transmission apparatus, comprising a plurality of operation shafts, a shift-and-select shaft having an engagement groove extending in a circumferential direction thereof, selecting one of a plurality of operation shafts by rotating and moving the selected operation shaft in an axial direction thereof by moving in an axial direction of the shift-and-select shaft, an operating portion for manually operating the shift-and-select shaft, an inertia unit including an engagement pin, positioned within the engagement groove and pivoting in response to a movement of the shift-and-select shaft in the axial direction thereof, and a swing-and-contact member provided at the engagement pin of the inertia unit so as to swing when being pressed by one of first and second inner surfaces of the engagement groove in accordance with the movement of the shift-and-select shaft and contacting the first and second inner surfaces of the engagement groove.

4 Claims, 5 Drawing Sheets and shift-operating the operation shaft, which is selected by the shift-and-select shaft, by being in contact with the operation shaft in response to an operation of the operating portion.

OPERATING DEVICE FOR MANUAL TRANSMISSION APPARATUS

CROSS REFERENCE TO RELATED APPLICATIONS

This application is based on and claims priority under 35 U.S.C. §119 to Japanese Patent Application 2008-150609, filed on Jun. 9, 2008 the entire content of which is incorporated herein by reference.

FIELD OF THE INVENTION

The present invention generally relates to an operating device for a manual transmission apparatus adapted to a vehicle and the like.

BACKGROUND

Generally, shift gear sets are provided to a synchromesh-type manual transmission apparatus in order to configure four to seven forward shift stages. Each of the shift gear sets is selectively engaged by means of a synchromesh mechanism. An operating device of the manual transmission apparatus for performing a shift operation includes fork shafts, each of which operates the corresponding synchromesh mechanism, a shift-and-select shaft for selecting and driving one of the fork shafts, a gear lever, which is operated by a driver, and an operation transmitting mechanism for transmitting an operation force applied to the gear lever to the shift-and-select shaft. Generally, the shift-and-select shaft is configured so as to rotate in a circumferential direction thereof and so as to move in an axial direction thereof. More specifically, in a case where the shift-and-select shaft rotates in the circumferential direction thereof in order to select one of the fork shafts (a select operation), the shift-and-select shaft moves in the axial direction thereof in order to move the selected fork shaft in an axial direction thereof (a shift operation). On the other hand, in a case where the shift-and-select shaft moves in the axial direction thereof in order to select one of the fork shafts (a select operation), the shift-and-select shaft rotates in the circumferential direction thereof in order to move the selected fork shaft in an axial direction thereof (a shift operation). In the synchromesh mechanism, which corresponds to the selected fork shaft (a selected gear stage), when a sleeve of the selected synchromesh mechanism is shift-operated by the selected fork shaft, the synchronizer ring (an input side portion) and the selected gear (an output side portion) are frictionally engaged by an inner slide mechanism of the synchromesh mechanism, thereby synchronizing a rotation of the selected gear and a rotation of an output side shaft of the manual transmission apparatus. Accordingly, the sleeve and the selected gear are fittedly connected by an engaging mechanism of the synchromesh mechanism via the synchronizer ring and the selected shift stage is established. The operation force necessary in a process of the shift operation of the synchromesh mechanism is not constant. Furthermore, a reaction force may be generated when the synchronizer ring is frictionally engaged with the selected gear or when the sleeve is fittedly connected with the selected gear, and such reaction force may be transmitted to the gear lever.

A demand for enhancing a shift feeling when performing the shift operation by controlling changes in the operation force or the reaction force of the synchromesh mechanism is increased. A shift device of a manual transmission apparatus for a vehicle, which is disclosed in JP2003-106449A, attempts to enhance the shift feeling by using inertial action, which is generated when pivoting an outer lever, which pivots around a shift-and-select shaft and to which an inertia lever and an inertia mass are provided. Furthermore, according to a shift mechanism for a manual transmission apparatus, which is disclosed in JP2008-32158A, an inertia mass is configured so as to be relatively displaced on an inertia lever, which pivots around a shift-and-select shaft, so that an inertia generated when a shift operation is performed by a driver is increased and the inertia when the shift operation is not performed by the driver is decreased in order to decrease vibration (oscillation) transmitted to a gear lever.

However, the shift device disclosed in JP2003-106449A and the shift mechanism disclosed in JP2008-32158A are adaptable to an operating device for a manual transmission apparatus, which is configured to shift-operate a fork shaft by rotating the shift-and-select shaft in a circumferential direction thereof. Therefore, the shift device disclosed in JP2003-106449A and the shift mechanism disclosed in JP2008-32158A are not adaptable to an operating device for a manual transmission apparatus, which is configured to shift-operate the fork shaft by moving the shift-and-select shaft in an axial direction thereof.

Furthermore, the inertia lever and the inertia mass are assembled to the operating device so as to ensure a certain clearance therebetween. In order to smoothly operate the inertia lever and the inertia mass. Additionally, the clearance is considered to be necessary in view of allowance when producing the inertia lever and the inertia mass and assembling operability. However, because the clearance is ensured at the operating device, delay or backlash may occur in the inertial action, which may result in failing to generate a sufficient shift feeling. For example, in a case where a moving speed of the shift-and-select shaft in the axial direction is reduced, the inertia lever or the inertia mass move in response to a movement of the shift-and-select shaft so as to delay for a time necessary for the inertia lever or the inertia mass to move within the clearance. Therefore, while the inertia lever or the inertia mass moves within the clearance, the inertial action is not generated, and the reaction force is directly transmitted to the gear lever, thereby deteriorating the shift feeling.

A need thus exists to provide an operating device for a manual transmission apparatus which is not susceptible to the drawback mentioned above.

SUMMARY OF THE INVENTION

According to an aspect of the present invention, an operating device for a manual transmission apparatus, includes a plurality of operation shafts supported at a housing so as to move in an axial direction of the operation shafts and selectively engaging one of a plurality of shift gear sets by one of the plurality of the operation shafts being moved in the axial direction thereof, a shift-and-select shaft having an engagement groove extending in a circumferential direction thereof, supported at the housing, selecting one of the plurality of the operation shafts by rotating in the circumferential direction and moving the selected operation shaft in the axial direction thereof by moving in an axial direction of the shift-and-select shaft, an operating portion for manually operating the shift-and-select shaft, an inertia unit including an engagement pin, which is positioned within the engagement groove of the shift-and-select shaft, at an end portion of the inertia unit, pivotably supported at the housing, and pivoting in response to a movement of the shift-and-select shaft in the axial direction thereof, and a swing-and-contact member swingably provided at the engagement pin of the inertia unit, swinging by being pressed by one of first and second inner surfaces of the engagement groove in accordance with the movement of the shift-and-select shaft and contacting the first and second inner surfaces of the engagement groove.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
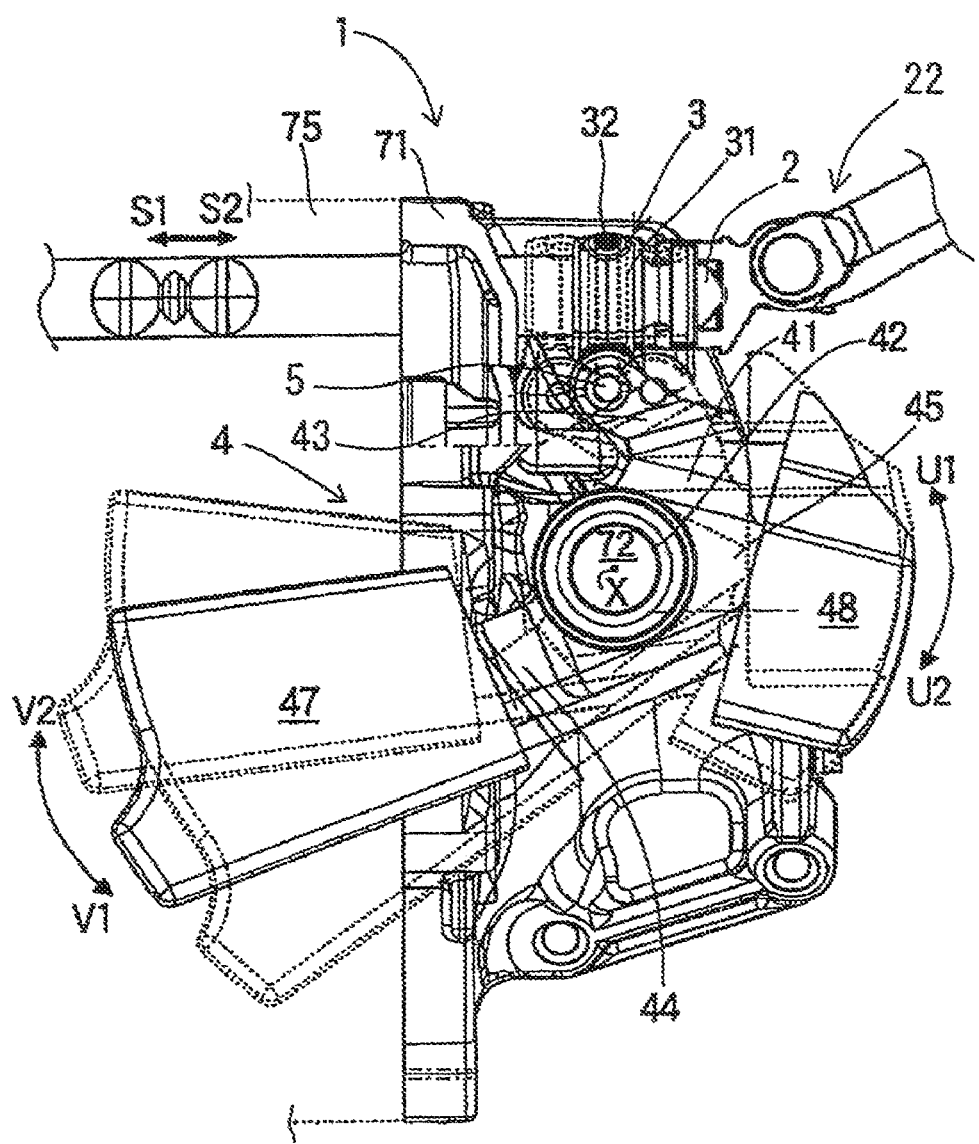
FIG. 1 is a diagram illustrating an operating device for a manual transmission apparatus according to an embodiment when being viewed from a side of the transmission apparatus.
Figure 2:
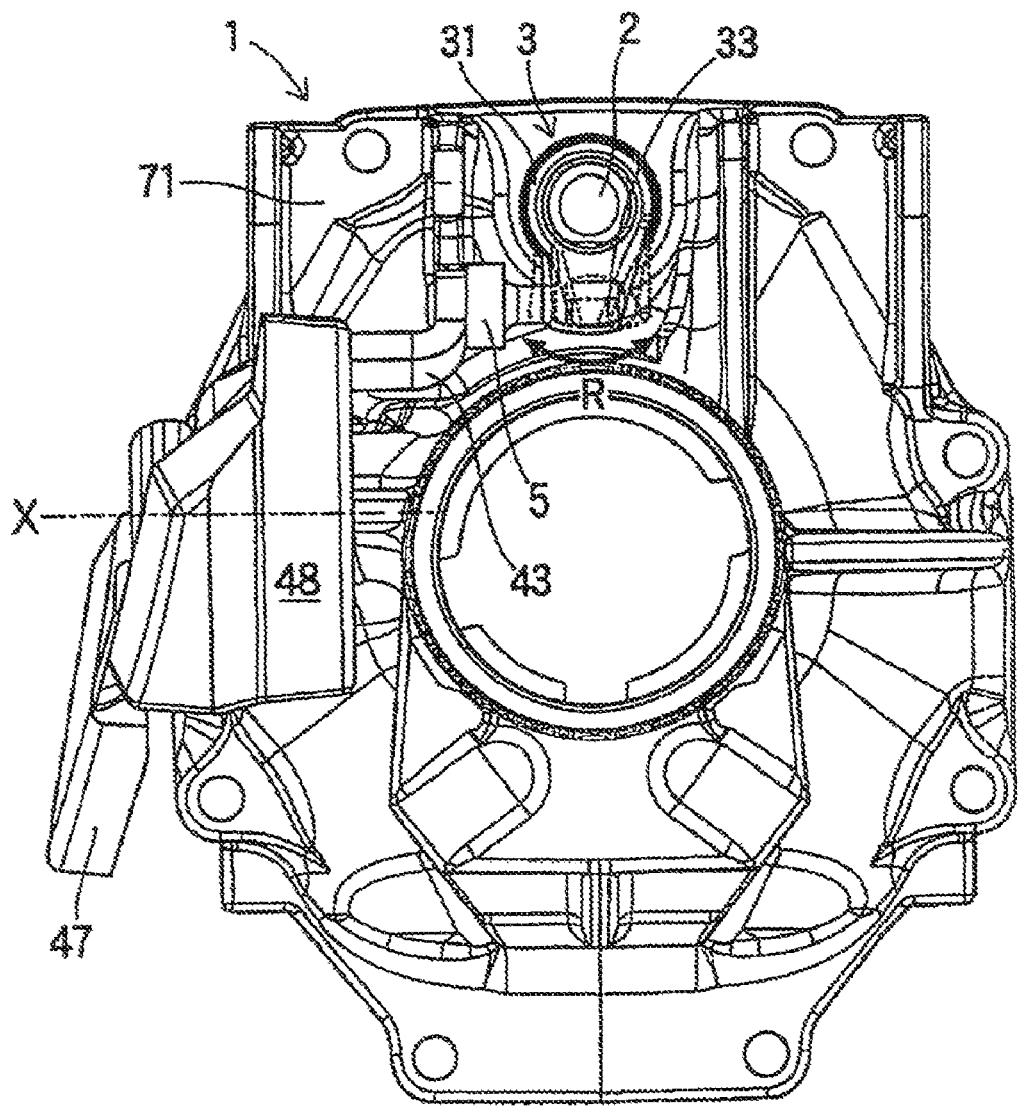
FIG. 2 is a diagram of the operating device when being viewed from a back side (i.e. from a right side of FIG. 1) of the transmission apparatus.
Figure 3:
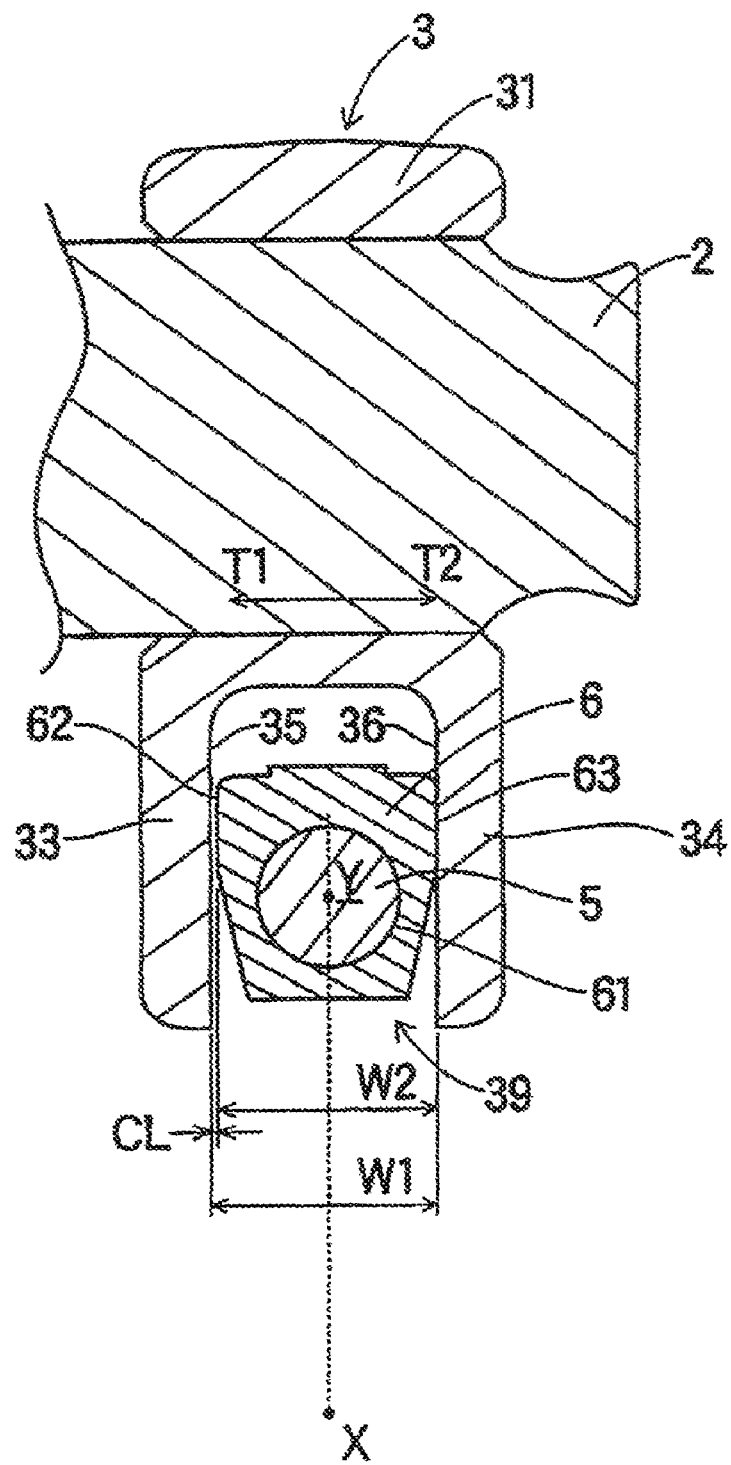
FIG. 3 is a partially enlarged cross-section diagram illustrating an engagement groove of a shift-and-select shaft, an engagement pin of an inertia unit and a swing-and-contact member.

An embodiment of an operating device adapted to, for example, a manual transmission apparatus will be described in accordance with FIGS. 1 to 4 of the attached drawings. Illustrated in FIG. 1 is a diagram of an operating device 1 of a manual transmission apparatus when being viewed from a side of the transmission apparatus. Illustrated in FIG. 2 is the operating device 1 when being viewed from a back side (i.e. from a right side of FIG. 1) of the transmission apparatus. Illustrated in FIG. 3 is a partially enlarged cross-section diagram illustrating an engagement groove 39 of a shift-and-select shaft 2, an engagement pin 5 of an inertia unit 4 and a swing-and-contact member 6. The operating device 1 of the manual transmission apparatus according to the embodiment includes the shift-and-select shaft 2, the inertia unit 4, the swing-and-contact member 6, three fork shafts 12 (operation shafts) (see FIG. 5), and an operating portion 22. A solid line in FIG. 1 indicates a case where the shift-and-select shaft 2 is in a neutral position, i.e. a case where the shift-and-select shaft 2 does not move either to the right or left in FIG. 1. A dashed line in FIG. 1 indicates a case where the shift-and-select shaft 2 moved to the right and left in the axial direction.

The shift-and-select shaft 2 is axially supported at an upper portion of the transmission apparatus therewithin by an extension housing 71 (a housing) provided at a back portion (i.e. from a right side of FIG. 1) of the transmission apparatus and a housing main body 75 (a housing), whose portion is illustrated by a dashed line in FIG. 1, so that the shift-and-select shaft is rotatable in a circumferential direction thereof and so as to be movable in the axial direction thereof. As illustrated in FIG. 1, a support member 3 is integrally provided on a circumferential surface of the shift-and-select shaft 2 at a portion thereof outwardly extending to the right in FIG. 1 from the extension housing 71. In this embodiment, the support member 3 is integrally provided on the shift-and-select shaft 2. However, the present invention is not limited to this structure, but the support member 3 may be integrally formed on the shift-and-select shaft 2. As illustrated in FIG. 3, the support member 3 includes a cylindrical portion 31 surrounding the shift-and-select shaft 2 and two plate-shaped groove forming portions 33 and 34 (a first groove forming portion 33 and a second groove forming portion 34), which are provided in parallel with each other at the cylindrical portion 31 so as to downwardly extend therefrom in FIG. 3. The cylindrical portion 31 is fixed on the shift-and-select shaft 2 via an attachment hole 32, which is provided at a top portion of the cylindrical portion 31, by screwing or press-fitting a pin thereinto. Furthermore, two groove forming portions 33 and 34 are provided at the cylindrical portion 31 in parallel with each other so as to be orthogonal to an axis of the shift-and-select shaft 2, so that the engagement groove 39 having a groove width W1 is formed between the groove forming portions 33 and 34 so as to extend in the circumferential direction of the shift-and-select shaft 2.

An inner lever is provided at an extended portion of the shift-and-select shaft 2 at the left side in FIG. 1. Three fork shafts 12 are provided at the inner lever so as to be engageable/disengageable. Three fork shafts 12 are supported at the housing main body 75 so as to be movable in an axial direction of each fork shaft 12, so that sleeves of synchromesh mechanisms are shift-operated by movement of the corresponding fork shafts 12 in the axial direction thereof.

Further, shift-and-select shaft 2 is configured so as to be operated by the operating portion 22. The operating portion 22 is configured with an operation lever, by which a driver performs an operation, and an operation cable, which transmits an operation force provided to the operation lever to the shift-and-select shaft 2. When the operating portion 22 rotates the shift-and-select shaft 2 in the circumferential direction thereof, the inner lever engages with one of three fork shafts 12 so as to perform a select operation. Furthermore, when the operating portion 22 moves the shift-and-select shaft 2 to the right or left in FIG. 1 in the axial direction thereof, the inner lever shift-operates the engaged fork shaft 12 to the right or left in response to the movement of the shift-and-select shaft 2.

As illustrated in FIG. 1, the inertia unit 4 is pivotably supported at an outer side surface of the extension housing 71 substantially at a middle position between upper and lower ends of the extension housing 71 in FIG. 1. The inertia unit 4 includes an inertia unit main body 41, first and second inertia masses 47 and 48 and the engagement pin 5. As illustrated in FIG. 1, the inertia unit main body 41 includes a hole 42 at a substantially middle portion thereof, an engagement arm portion 43, which is provided so as to upwardly extend in FIG. 1, a first inertia arm portion 44, which is provided so as to extend towards a lower left side in FIG. 1, and a second inertia arm portion 45, which is provided so as to extend towards the right in FIG. 1. A pivot boss, which is provided at the extension housing 71 so as to protrude therefrom, is inserted into the hole 42, so that the inertia unit 4 is pivotably supported by the extension housing 71. In other words, the inertia unit 4 is supported by the extension housing 71 so as to pivot (rotate) in a clockwise direction and counterclockwise direction in FIG. 1 around a pivot axis X at a center portion of the pivot boss 72.

The first inertia mass 47, which is formed in a block shape, is fixed at an edge portion of the first inertia arm 44. Similarly, the second inertia mass 48, which is formed in a block shape, is fixed at an edge portion of the second inertia arm 45. The inertia unit 4 includes moment of inertia centered on the pivot axis, as is evident from the mechanical dynamics. The first and second inertia arm portions 44 and 45 and the first and second inertia masses 47 and 48 largely increase the moment of inertia, thereby increasing an inertial action. As illustrated in FIG. 2, the engagement arm portion 43 forms a bending shape so as to upwardly extend in FIG. 2. The engagement pin 5 is integrally provided at an upper end portion of the engagement arm portion 43. The engagement pin 5 is provided at the upper end portion of the engagement arm portion 43 so as to extend in a right-and-left direction in FIG. 2 (i.e. so that an longitudinal direction of the engagement pin 5 corresponds to the right-and-left direction in FIG. 2). Further, as illustrated in FIG. 3, the engagement pin 5 is provided within the engagement groove 39, which is formed by the first and second groove forming portions 33 and 34. Additionally, the first and second groove forming portions 33 and 34 include first and second inner surfaces 35 and 36, respectively, so that the first and second inner surfaces face one another. Furthermore, the first and second inner surfaces define the engagement groove 39, i.e. the first and second inner surfaces also refer to inner surfaces of the engagement groove 39.

As illustrated in a cross-section diagram of FIG. 3, the swing-and-contact member 6 is formed so as to be symmetrical. The swing-and-contact member 6 includes a through hole 61, into which the engagement pin 5 of the inertia unit 4 is inserted, at substantially middle portion of the swing-and-contact member 6 when being viewed in the cross-section, so that the swing-and-contact member 6 is configured so as to swing relative to a center of the engagement pin 5 as a swing center axis Y. Furthermore, the swing-and-contact member 6 is configured so as to have a width W2, which is set to be smaller than the groove width W1 of the engagement groove 39, so that a clearance CL is formed between the swing-and-contact member 6 and the engagement groove 39 when the support member 3 is not operated in the axial direction of the shift-and-select shaft 2. The swing-and-contact member 6 also includes first and second contact surfaces 62 and 63, which face the first and second inner surfaces 35 and 36 of the engagement groove 39, respectively. The first and second contact surfaces 62 and 63 are positioned above the swing center axis Y at a portion of the swing-and-contact member 6 farther from the pivot axis X, which is positioned at the bottom side in FIG. 3, than the swing center axis Y. More specifically, the first and second contact surfaces 62 and 63 are positioned at, for example, upper half portion of the swing-and-contact member 6 facing to the cylindrical portion 31 of the support member 3. The swing-and-contact member 6 is configured so that its width lower than the first and second contact surfaces 62 and 63 gradually narrows towards a lower portion thereof.

The engagement pin 5 is configured so as to pivot around the pivot axis X in FIG. 3. The swing-and-contact member 6 is configured so as to swing relative to the swing center axis Y in FIG. 3.

An operation of the operating device 1 for the manual transmission apparatus according to the embodiment will be described below.

When the driver starts the shift operation while the shift-and-select shaft 2 is at the neutral position as illustrated in FIG. 1, the shift-and-select shaft 2 is rotated in order to select one of the fork shafts 12 (the select operation). While the select operation is being performed, the support member 3 also rotates in response to the rotation of the shift-and-select shaft 2, as indicated by an arrow R in FIG. 2. The support member 3 rotates so that the first and second inner surfaces 35 and 36 of the engagement groove 39, formed at the support member 3, moves relative to the swing-and-contact member 6 so as to pass over the swing-and-contact member 6 (so as not to generate a frictional force between the swing-and-contact member 6 and the first and second inner surfaces 35 and 36 of the support member 3). Therefore, the engagement pin 5 does not move and the inertia unit 4 does not pivot (rotate). In other words, weight of the inertia unit 4 does not affect on the select operation, therefore, the inertia unit 4 does not deteriorate a feeling when the select operation is being performed (i.e. a select feeling).

Following the select operation, the shift-and-select shaft 2 moves to the right or left in the axial direction thereof in FIG. 1, as indicated by arrows S1-S2, in order to shift the selected operation shaft (i.e. the selected fork shaft 12) (i.e. the shift operation). For example, when the shift operation is being performed, the support member 3 moves in a direction indicated by an arrow T1 in FIG. 3, so that the second inner surface 36 of the engagement groove 39 presses the swing-and-contact member 6, thereby moving the engagement pin 5. On the other hand, in a case where the support member 3 moves in a direction indicated by an arrow T2 in FIG. 3 while the shift operation is being performed, the first inner surface 35 of the engagement groove 39 presses the swing-and-contact member 6, thereby moving the engagement pin 5. Accordingly, the engagement arm portion 43 of the inertia unit 4 is operated, so that the entire inertia unit 4 pivots (rotates) as indicated by arrows U1-U2 and V1-V2. The operation force necessary when the shift operation is started is set to be a sum of a force necessary for the shift-and-select shaft 2 and the fork shafts 12 start being moved in the axial direction and a force necessary for the inertia unit 4 starts being moved so as to resist the inertia moment.

An operation of the swing-and-contact member 6 will be described below with reference to FIG. 4. The swing-and-contact member 6 is configured as to be symmetrical and so as to move to the left and right in FIG. 4. Therefore, in this embodiment the operation of the swing-and-contact member 6 will be described with a case where the swing-and-contact member 6 moves to the left as an example. Illustrated in FIG. 4 is a diagram for explaining the operation of the shift-and-select shaft 2 when moving to the left.

Figure 4:
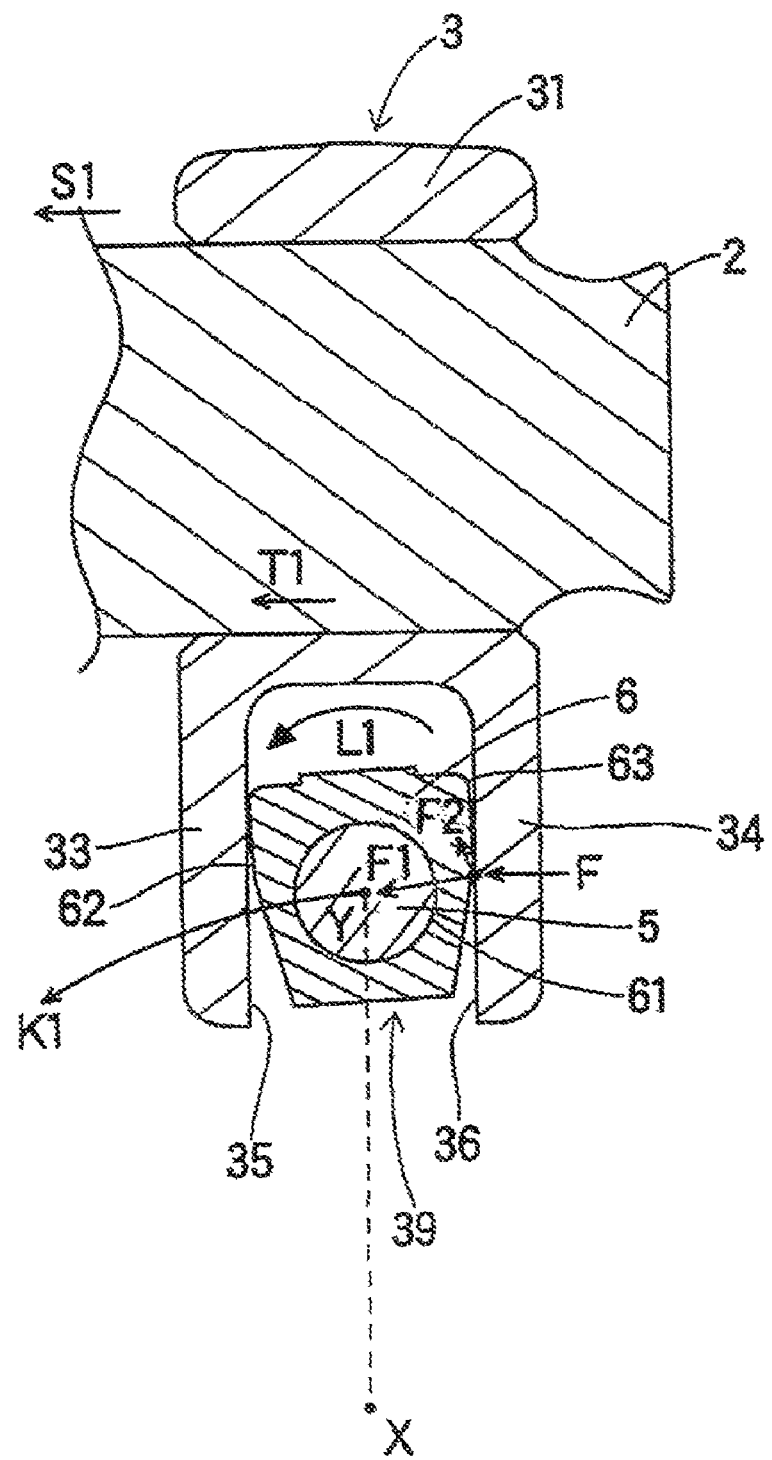
FIG. 4 is a diagram for explaining an operation of movement of the shift-and-select shaft to the left.
Figure 5:
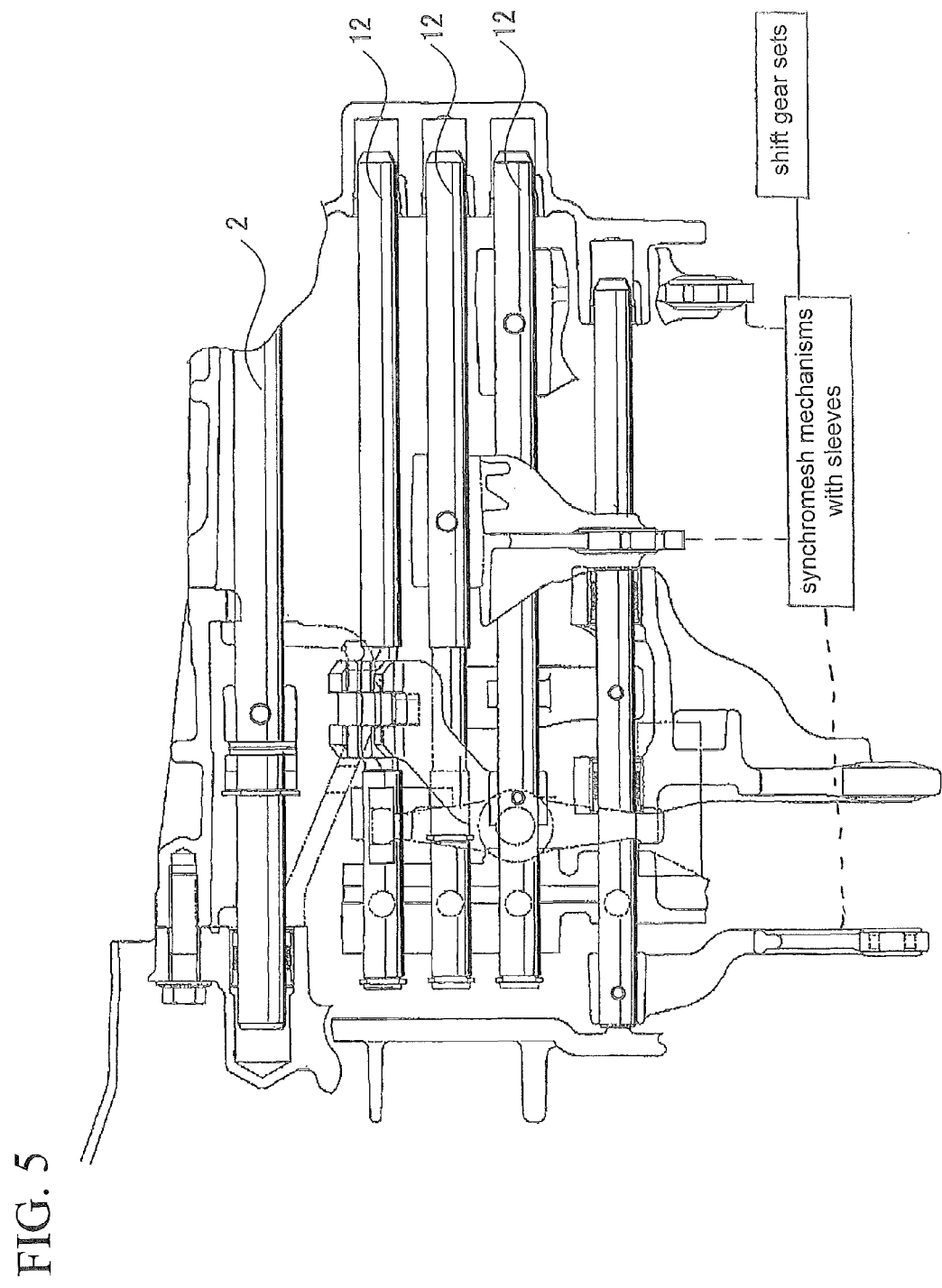
FIG. 5 is a partial cross-sectional diagram schematically illustrating a configuration example of the manual transmission apparatus when being viewed from a side thereof.

When the shift-and-select shaft 2 moves to the left in FIG. 4 (i.e. in the direction indicated by the arrow S1), the support member 3 also moves to the left together with the shift-and-select shaft 2 (i.e. in the direction indicated by the arrow T1). The second inner surface 36 of the second groove forming portion 34 provided at the right side of the support member 3 in FIG. 4 presses the second contact surface 63 of the swing-and-contact member 6 at the right side thereof to the left with a load F. As the second contact surface 63 is positioned at the upper portion of the swing-and-contact member 6 relative to the swing center axis Y, it is considered that the load F is dispersed into a force F1 generated towards the swing center axis Y and a rotational force F2 generated around the swing center axis Y. The rotational force F1 generated around the swing center axis Y acts on the engagement pin 5, thereby pivoting the entire inertia unit 4 in the counterclockwise direction (in the direction indicated by an arrow K1 in FIG. 4). The rotational force F2 generated around the swing center axis Y acts on the swing-and-contact member 6, thereby swinging the swing-and-contact member 6 in the counterclockwise direction (in the direction indicated by an arrow L1 in FIG. 4). The swung swing-and-contact member 6 is postured so as to incline relative to the engagement groove 39, so that the first contact surface 62 of the swing-and-contact member 6 at the right side thereof contacts the first inner surface 36 of the first groove forming portion 33. In other words, the swing-and-contact member 6 contacts the first and second inner surfaces 35 and 36 of the engagement groove 39, thereby closing the clearance CL.

The shift operation of the selected fork shaft 12 and the pivot operation of the inertia unit 4 are simultaneously performed under the condition where the clearance CL is being closed. Therefore, in a case where a moving speed of the shift-and-select shaft 2 changes due to changes in the operation force or a reaction force, impetus generated when the inertia unit 4 pivots immediately absorbs the changes in the operation force and the reaction force. Therefore, the changes in the operation force applied by the driver are reduced, which may result in smoothing the shift operation, thereby enhancing the shift feeling.

In the case where the shift-and-select shaft 2 is moved to the right, the swing-and-contact member 6 swings in the clockwise direction. Therefore, a similar operation is performed for the select operation and the shift operation, as is the case where the swing-and-contact member 6 swings in the counterclockwise direction, which is described above.

According to the embodiment, the shift-and-select shaft 2 further includes the support member 3, which includes first and second groove forming portions 33 and 34 for defining the engagement groove 39.

According to the embodiment, the swing-and-contact member 6 swings around the center of the engagement pin 5 as the swing center axis Y. Furthermore, the swing-and-contact member 6 is provided within the engagement groove 39 so as to form the clearance CL between the swing-and-contact member 6, having the width W2, and the engagement groove 39, having the groove width W1 larger than the width W2. The swing-and-contact member 6 includes the first and second contact surfaces 35 and 36 at positions farther from the pivot axis X of the inertia unit 4 than the swing center axis Y.

According to the embodiment, the plurality of the operation shafts are fork shafts 12 for operating sleeves of corresponding synchromesh mechanisms, respectively.

According to the operating device 1 for the manual transmission apparatus of the embodiment, the operation device 1 for the manual transmission is configured so that the shift-and-select shaft 2 and the inertia unit 4 are engageable with each other via the swing-and-contact member 6, so that the shift operation of the selected fork shaft 12 and the pivot operation of the inertia unit 4 are simultaneously performed by moving the shift-and-select shaft 2 in the axial direction thereof. Accordingly, the changes in the operation force and the reaction are absorbed by the inertial action generated when the inertia unit 4 pivots. Furthermore, because the clearance CL formed between the shift-and-select shaft 2 and the inertia unit 4 is closed by the swinging operation of the swing-and-contact member 6, a time delay in the inertial action is reduced, thereby smoothing the shift operation performed by the driver and enhancing the shift feeling.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An operating device for a manual transmission apparatus, comprising:
   a plurality of operation shafts supported at a housing so as to move in an axial direction of the operation shafts and selectively engaging one of a plurality of shift gear sets by one of the plurality of the operation shafts being moved in the axial direction thereof;
   a shift-and-select shaft having an engagement groove extending in a circumferential direction thereof, supported at the housing, selecting one of the plurality of the operation shafts by rotating in the circumferential direction and moving the selected operation shaft in the axial direction thereof by moving in an axial direction of the shift-and-select shaft;
   an operating portion for manually operating the shift-and-select shaft;
   an inertia unit including an engagement pin, which is positioned within the engagement groove of the shift-and-select shaft, at an end portion of the inertia unit, pivotably supported at the housing, and pivoting in response to a movement of the shift-and-select shaft in the axial direction thereof;
   a swing-and-contact member swingably provided at the engagement pin of the inertia unit, swinging by being pressed by one of first and second inner surfaces of the engagement groove in accordance with the movement of the shift-and-select shaft and contacting the first and second inner surfaces of the engagement groove;
   wherein the swing-and-contact member swings around a center of the engagement pin as a swing center axis, the engagement pin being provided within the engagement groove so that a clearance exists between the swing-and-contact member, having a width, and the engagement groove, having a groove width larger than the width of the swing-and-contact member, the first and second inner surfaces being at positions farther from a pivot axis of the inertia unit than the swing center axis;
   the engagement pin being fixed to an engagement arm which is connected to an inertia mass of the inertia unit so that rotation of the engagement pin about the swing center pivots the inertia mass about the pivot axis; and
   the swing-and-contact member having contact surfaces parallel to and facing the first and second inner surfaces of the engagement groove of the shift-and-select shaft, respectively.

2. The opening device for the manual transmission apparatus according to claim 1, wherein the shift-and-select shaft further includes a support member, which includes first and second groove forming portions for defining the engagement groove.

3. The operating device for the manual transmission apparatus according to claim 1, wherein the plurality of the operation shafts are fork shafts for operating sleeves of corresponding synchromesh mechanisms, respectively.

4. The operating device for the manual transmission apparatus according to claim 2, wherein the plurality of the operation shafts are fork shafts for operating sleeves of corresponding synchromesh mechanisms, respectively.

* * * * *